United States Patent
Carranza et al.

(10) Patent No.: US 9,313,722 B2
(45) Date of Patent: Apr. 12, 2016

(54) SYSTEM AND METHOD FOR DETERMINATION OF PROXIMITY BETWEEN WIRELESS DEVICES

(71) Applicant: Intel Corporation, Santa Clara, CA (US)

(72) Inventors: Marcos A. Carranza, Cordoba (AR); Dan F. Hirsch, Cordoba (AR); Marcos J. Oviedo, Cordoba (AR)

(73) Assignee: Intel Corporation, Santa Clara, CA (US)

(*) Notice: Subject to any disclaimer, the term of this patent is extended or adjusted under 35 U.S.C. 154(b) by 159 days.

(21) Appl. No.: 13/974,560

(22) Filed: Aug. 23, 2013

(65) Prior Publication Data

US 2014/0357267 A1   Dec. 4, 2014

Related U.S. Application Data

(60) Provisional application No. 61/827,979, filed on May 28, 2013.

(51) Int. Cl.
  *H04W 48/16*   (2009.01)
(52) U.S. Cl.
  CPC .................................... *H04W 48/16* (2013.01)
(58) Field of Classification Search
  CPC ....... H04W 4/02; H04W 4/008; H04W 4/023; H04W 64/00; H04W 48/16
  See application file for complete search history.

(56) References Cited

U.S. PATENT DOCUMENTS

| | | | |
|---|---|---|---|
| 7,035,618 B2* | 4/2006 | Schnurr | 455/404.2 |
| 7,509,131 B2* | 3/2009 | Krumm et al. | 455/456.1 |
| 8,745,250 B2* | 6/2014 | Shah et al. | 709/229 |
| 8,836,502 B2* | 9/2014 | Culbert et al. | 340/539.22 |
| 2005/0113107 A1* | 5/2005 | Meunier | 455/456.1 |
| 2007/0030824 A1* | 2/2007 | Ribaudo et al. | 370/328 |
| 2013/0344859 A1* | 12/2013 | Abramson et al. | 455/418 |
| 2014/0162688 A1* | 6/2014 | Edge | 455/456.1 |
| 2014/0206382 A1* | 7/2014 | Shabtay | 455/456.1 |

OTHER PUBLICATIONS

Carreras et al. "Comm2Sense: Detecting Proximity Through Smartphones". International Workshop on the Impact of Human Mobility in Pervasive Systems and Applications 2012, Lugano. Mar. 2012.*

(Continued)

*Primary Examiner* — Nathan Mitchell
(74) *Attorney, Agent, or Firm* — Garrett IP, LLC

(57) ABSTRACT

Methods and systems to determine the proximity of wireless devices to each other. In an embodiment, the proximity may be determined as a membership in a classification, e.g., high, medium, or low proximity of one wireless device to a second. The process for determining proximity may include a training phase, where a set of wireless devices may perform scans to determine the identities and number of wireless access points, such as wireless routers. From this, statistical features may be extracted and used to perform training; the output of this training may be a set of trained models. The trained models may be used in an operational phase. Here, scan data from wireless devices may be submitted to a feature extraction process. The extracted features may then be used to determine the trained model most closely fitting the extracted features.

18 Claims, 9 Drawing Sheets

(56) References Cited

OTHER PUBLICATIONS

J. Krumm and K. Hinckley, "The nearme wireless proximity server," in Proc. of UBICOMP, Nottingham, England, 2004.*

Banerjee et al. "Virtual compass: Relative positioning to sense mobile social interactions," in Proc. of Pervasive Computing, Helsinki, Finland, 2010.*

* cited by examiner

SYSTEM AND METHOD FOR DETERMINATION OF PROXIMITY BETWEEN WIRELESS DEVICES

CROSS-REFERENCE TO RELATED APPLICATIONS

This application claims the benefit of U.S. Provisional Application Ser. No. 61/827,979, filed May 28, 2013.

TECHNICAL FIELD

Embodiments described herein relate to wireless networks.

BACKGROUND

It can sometimes be useful to determine the proximity between wireless devices. A user of a given wireless device may wish to know what other wireless devices and/or their owners are nearby, for example. This may be useful in social settings, for example, where a user may want to be aware of other users in a crowded coffee shop, store, or public event. In another example, it may be useful to determine what wireless devices are inside or outside of a given perimeter, for security or accountability purposes.

The problem is currently being addressed in several ways. Some proposed solutions try to use Bluetooth or wi-fi received signal strength indication (RSSI) as a measure of distance between devices. This use of RSSI is highly inaccurate, however, due to the variations of this value as a consequence of environmental factors. The features of a building, such as metal or concrete structures, may lead to an unreliable solution. In addition, different manufacturers of wireless devices and routers may determine an RSSI in different ways, since there is no single agreed upon specification as to how to determine an RSSI, other than to bound them within the range of [−100,0]. A future Bluetooth standard may allow for proximity determination—such a standard may include a proximity profile. A standard like this may not be widely adopted for several years, however.

BRIEF DESCRIPTION OF THE DRAWINGS/FIGURES

Figure 1:
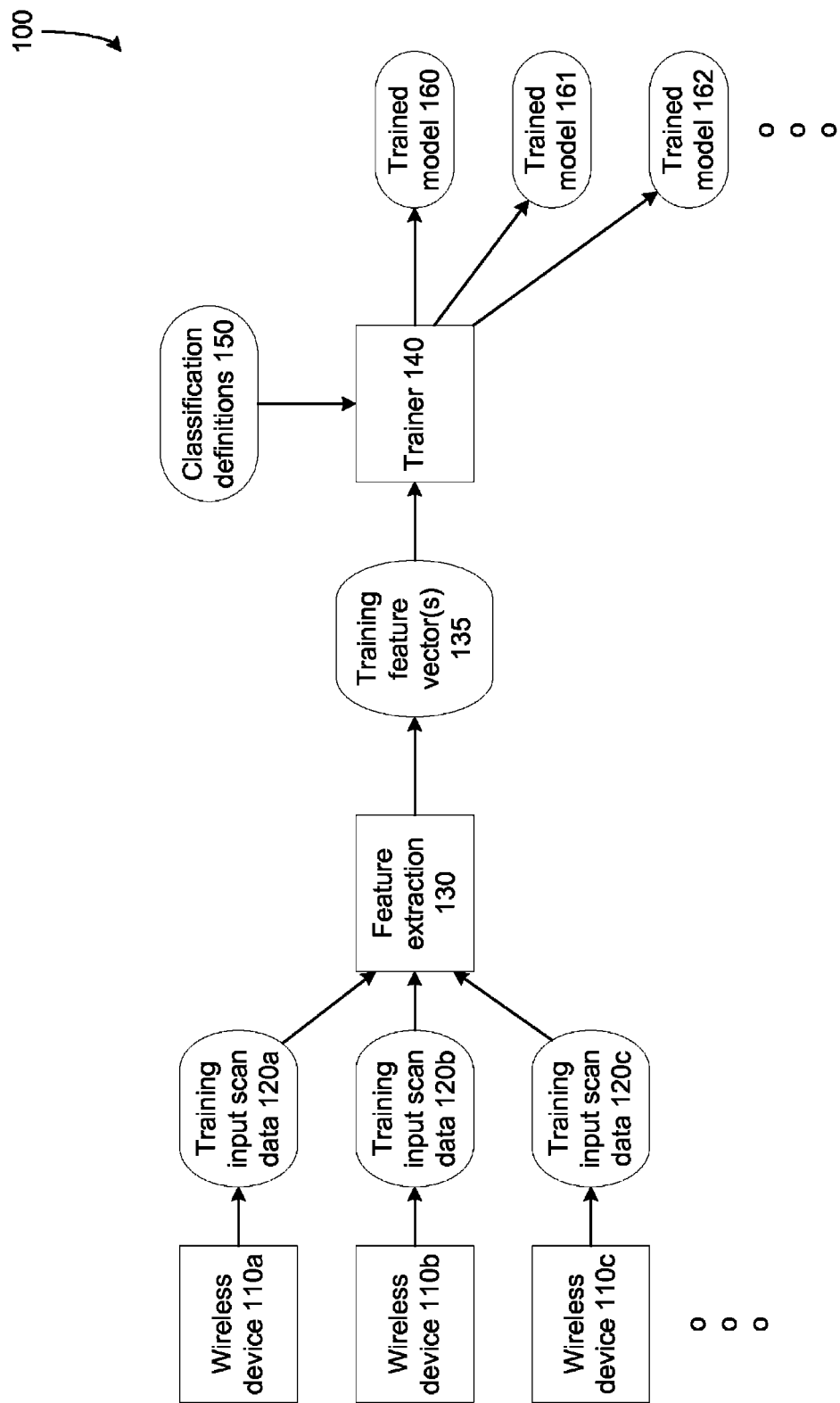
FIG. 1 is a block diagram illustrating a feature extraction and training process, according to an embodiment.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods and systems to determine the proximity of wireless devices to each other. Such wireless devices may include, for example and without limitation, cell phones, tablet computers, wearable computing devices, netbooks, laptops, and desktop computers. In an embodiment, the proximity may be determined as a membership in a classification, e.g., high, medium, or low proximity of one wireless device to a second wireless device, or whether a first wireless device is inside or outside of a perimeter surrounding a second wireless device. The process for determining proximity may include a training phase, where a set of wireless devices may perform scans to determine the identities and number of wireless access points, such as wireless routers. From this information, statistical features may be extracted and used to perform training; the output of this training is a set of trained models. The trained models may then be used in an operational phase. Here, scan data from a pair of wireless devices may be submitted to a feature extraction process. The extracted features may then be used in a classification process that determines the trained model most closely fitting, or modeling, the extracted features. By identifying the appropriate trained model, a corresponding proximity classification may be determined for the pair of wireless devices.

Note that the pair of wireless devices may or may not be in the set of wireless devices used in the training phase; if so, they may or may not be in the same physical location as they were during training. Generally, the set of wireless devices that participate in training may or may not be the same set of wireless devices that are taking part in the operational phase.

A training process is illustrated in FIG. 1, according to an embodiment. A set of wireless devices 110a . . . 110c is shown, which may generate training input scan data 120a . . . 120c respectively. While three wireless devices are shown in FIG. 1, it is to be understood that any number of wireless devices may be used for purposes of the training process. As noted above, in an embodiment the training input scan data may include the number and identity of wireless access points that are accessible to each wireless device, and the signal strength of one or more wireless access point from the perspective of each wireless device. The training input scan data 120 may be provided to a feature extraction module 130. The feature extraction module 130 may process the training input scan data 120 to extract additional statistical information. This information may be formatted and output as one or more feature vectors 135, where each component of a feature vector 135 may represent a piece of statistical information, i.e., a feature. The feature extraction process will be described in greater detail below. In an embodiment, a separate feature vector may be generated for every pair of wireless devices.

The training feature vector(s) 135 may be sent to a trainer module 140. Here the vector(s) 135 may be processed to create a plurality of trained models 160, 161, etc. After the training phase is completed, the trained models 160, 161, . . . may be used to determine a proximity classification for a pair of wireless devices. In the embodiment of FIG. 1, trainer module 140 may also receive classification definitions 150. Each of the defined classifications may correspond to a particular trained model, and defines criteria for membership in the classification. The feature extraction and training processes will be described in greater detail below.

As noted above, the training process may use classifications that reflect different definitions of clusters. The classifications may reflect low, medium, or high proximity between wireless devices for example, or whether a first device is inside or outside of a perimeter surrounding a second device. It should be kept in mind that these only represent examples and are not limiting. Training and classification may be performed according to alternative classification definitions as well, as defined by a user.

Figure 2:
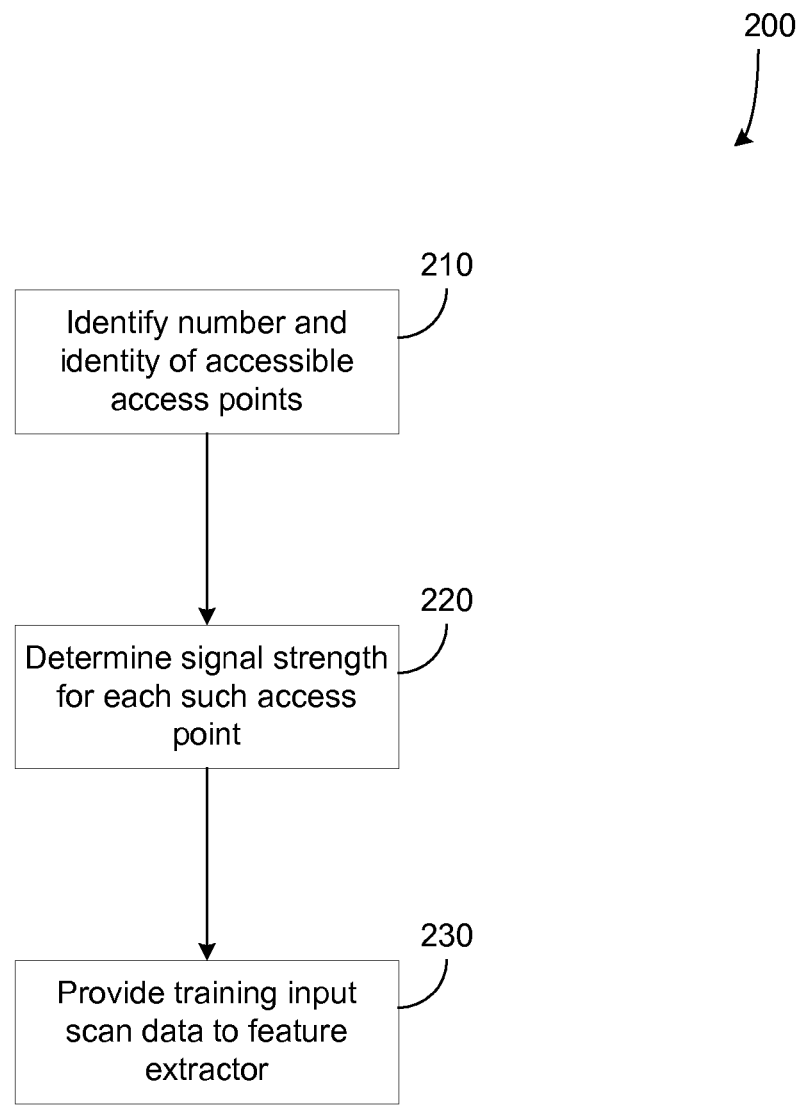
FIG. 2 is a flow chart illustrating processing at a wireless device, according to an embodiment.

Processing at a wireless device during the training phase is illustrated in FIG. 2, according to an embodiment. The process may begin with the wireless device scanning its wireless environment for information regarding access points. At 210, a wireless device may determine the identity of the access points that are accessible to the wireless device and determine the number of such access points. At 220, the wireless device may determine the signal strength for each such access point. In an embodiment, the signal strength(s) may be quantified using the RSSI scale. The information collected through the scanning process at 210 and 220 may be viewed as scan data. At 230, this scan data may be used as training input that may be provided to the feature extraction module. In various embodiments, training input scan data may be provided by a large number of wireless devices that are located in a variety of physical locations relative to the wireless access points. A greater volume and breadth of training input scan data may enhance the training process.

Figure 3:
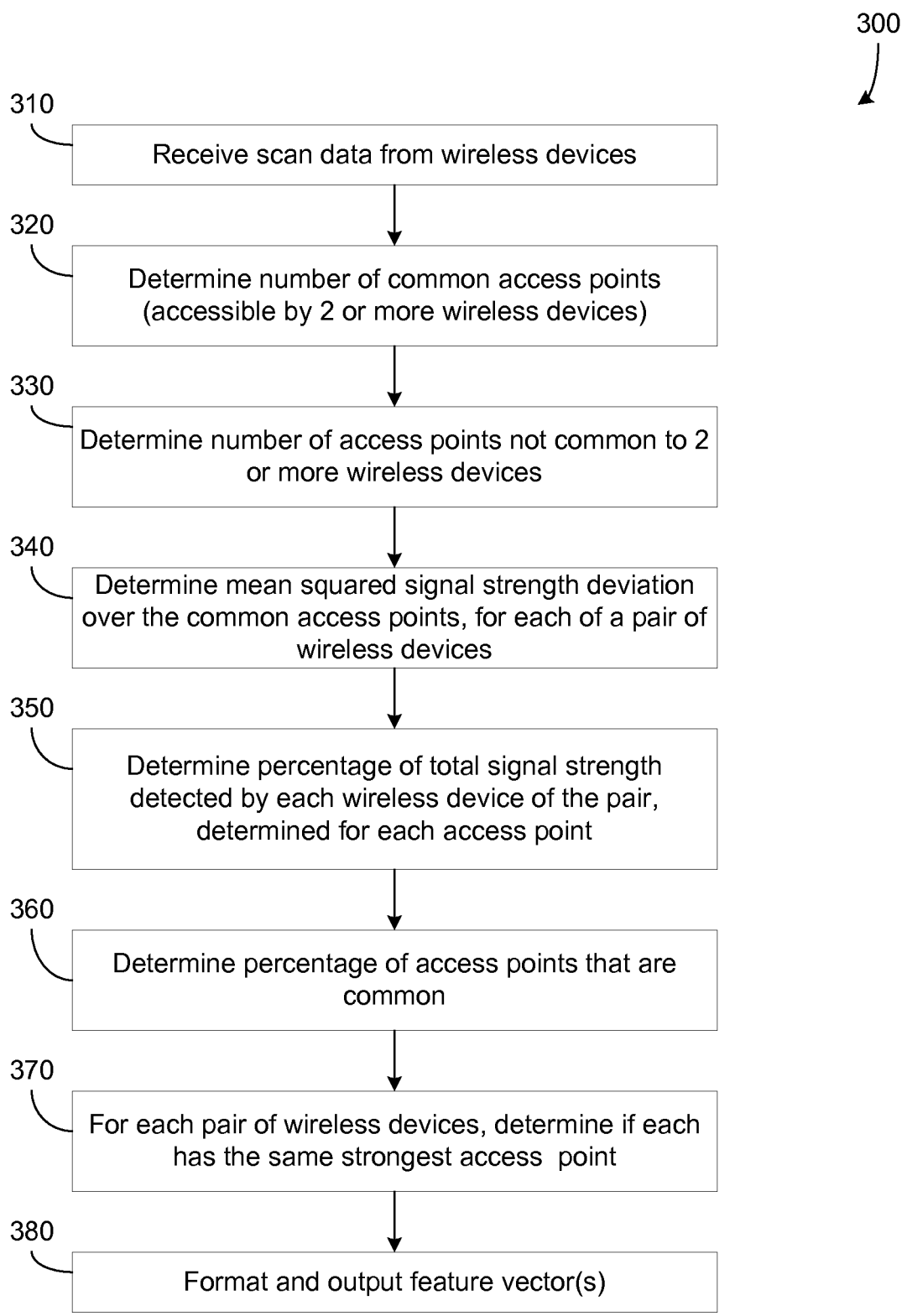
FIG. 3 is a flow chart illustrating feature extraction, according to an embodiment.

Processing at the feature extraction module may proceed as shown in the embodiment of FIG. 3. At 310, the training input scan data may be received. At 320-370, various features may be extracted from this data. At 320, the number of common access points may be determined, where a common access point may be defined as an access point that is accessible by two or more wireless devices. At 330, the number of access points that are not common to two or more wireless devices may be determined.

At 340, the difference in its signal strength among a pair of the wireless devices that detect common access points may be determined. This may be quantified as a mean squared signal strength deviation over the common access points. In an embodiment, a normalization process may first be applied to the signal strength to adjust for the varying sensitivity of wi-fi antennae of the wireless devices. The normalization may use an average of the signal strength detected for all wireless access points detected in a single scan by a wireless device. After normalization, the mean squared signal strength deviation may then be calculated. At 350, the percentage of an access point's total signal strength detected by each wireless device of the pair may be determined, for each access point. In an embodiment, the same normalization discussed above may also be applied here. Moreover, the values determined in 340 and 350 (the mean squared signal strength deviation and the wireless common power percentage, respectively) both with and without normalization may be retained for subsequent use.

At 360, the percentage of all wireless access points that are common access points may be determined. At 370, for each pair of wireless devices, a binary determination may be made as to whether each device in this pair has the same strongest access point. At 380, the features extracted in 320-370 may be formatted as one or more feature vectors and output to a trainer module.

In alternative embodiments, one or more of the items 320-370 may not be performed. In such an embodiment, the resulting feature vector may have fewer components than that generated by the embodiment of FIG. 3.

Figure 4:
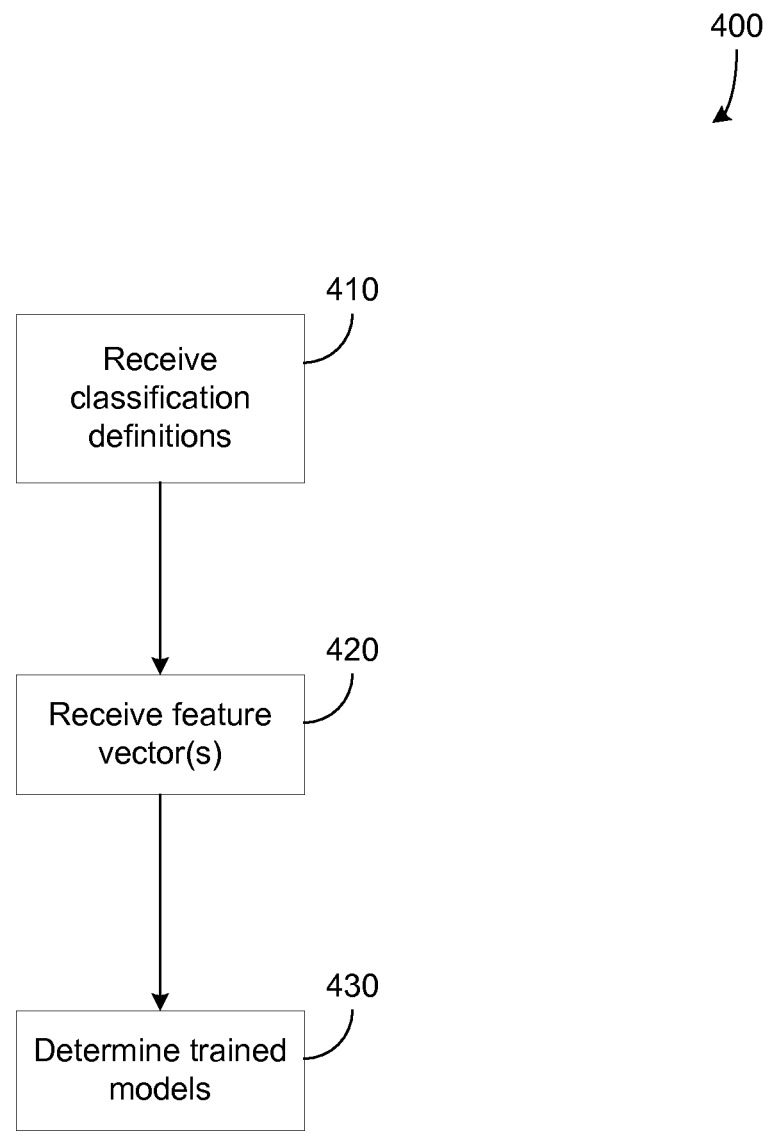
FIG. 4 is a flow chart illustrating processing at a training module, according to an embodiment.

Processing at the trainer module is illustrated at FIG. 4, according to an embodiment. At 410, classification definitions may be received at the trainer module. As noted above, a classification definition may be viewed as criteria for inclusion of a pair of wireless devices in a given classification, e.g., high, medium, or low proximity between the two wireless devices. At 420, the feature vector(s) may be received from the feature extraction module. At 430, trained models may be determined. In an embodiment, a trained model may be determined for each classification. If, in operation, a pair of wireless devices is found to fit a particular trained model within acceptable predefined limits, then the pair may be treated as belonging to a classification that corresponds to this trained model.

In an embodiment, a trained model may be an abstraction of the distribution of locations and proximities of wireless devices. In practice, a trained model may effectively represent a set of conditions under which the proximity of a pair of wireless devices is likely, with some probability, to fall into a particular classification. The trained model may be constructed on the basis of the statistics in the feature vector(s), using artificial intelligence methods. In an embodiment, the trained model may be a Gaussian mixture model; alternatively the trained model may be a k-means clustering model. Other known models may also serve this purpose, as would be understood by persons of ordinary skill in the art.

Note that in some embodiments, the feature extraction and training modules may be embodied in one or more computing devices external to the wireless devices. In an embodiment, the feature extraction and training modules may be implemented in a separate server, for example. In such an embodiment, the training input scan data may be sent to the server for feature extraction and development of trained models.

Figure 5:
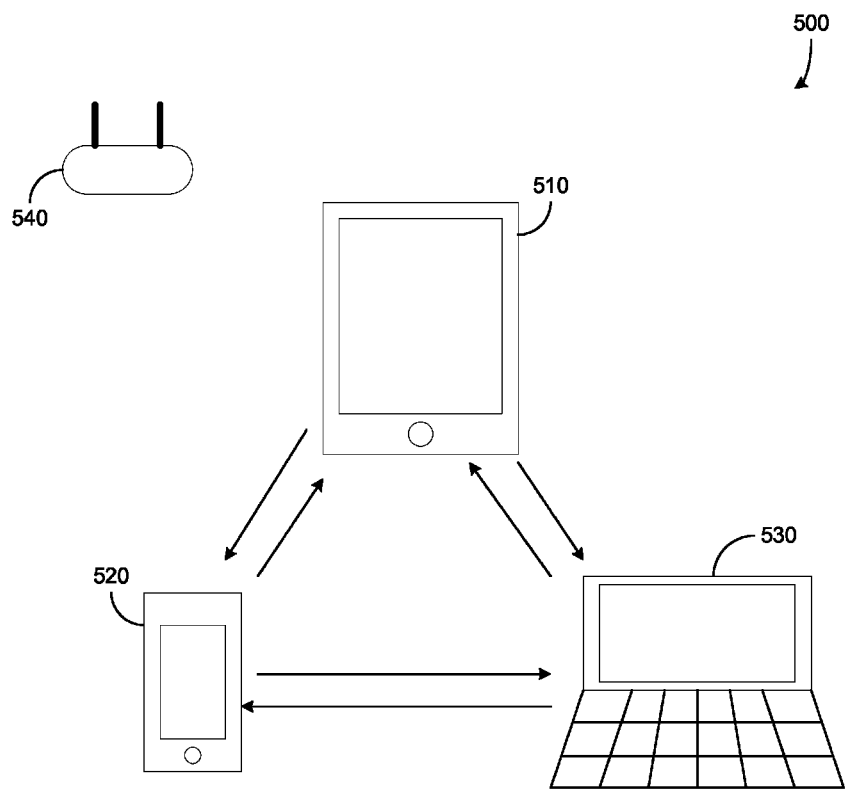
FIG. 5 is a diagram illustrating communication among wireless devices, according to an embodiment.
Figure 5:
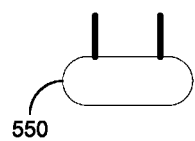

Alternatively, some or all of the wireless devices may perform feature extraction and training internally. In such an embodiment, the scan data may be exchanged among the wireless devices. This is illustrated in FIG. 5. A tablet computer 510, a laptop 530, and a smartphone 520 may all be in communication with each other, either directly or via a wireless network. Each of these devices may scan their wi-fi environment and generate training input scan data, comprising the identity and number of accessible wireless access points (such as wireless access points 540 and 550), and the signal strengths of each such access point. Each wireless device may then exchange this scan data with the other wireless devices. Each wireless device may then perform feature extraction and training locally. While FIG. 5 shows three wireless devices 510, 520 and 530, it is to be understood that more than three devices may be used in training. As mentioned above, a greater number of devices in a variety of locations may enhance the training process.

Figure 6:
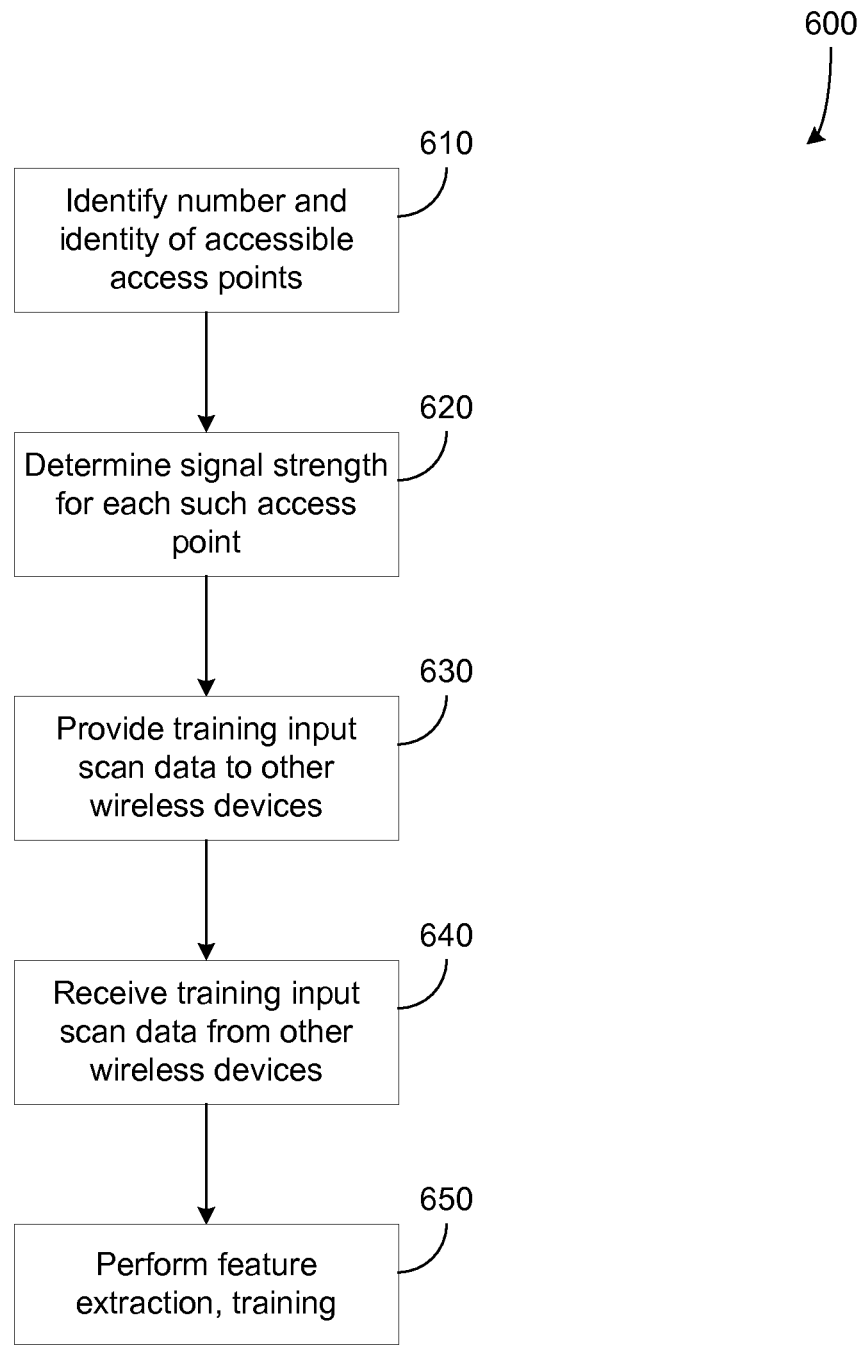
FIG. 6 is a flow chart illustrating processing at a wireless device, according to an alternative embodiment.

Processing at a wireless device in such an embodiment is illustrated in FIG. 6. The process may begin with the wireless device scanning its wireless environment for information regarding access points. At 610, a wireless device may determine the identity of the access points that are accessible to the wireless device and determine the number of such access points. At 620, the wireless device may determine the signal strength for each such access point. In an embodiment, the signal strength(s) may be quantified using the RSSI scale, as noted above. The information collected through the scanning process at 610 and 620 may be treated as scan data. At 630, this scan data may be used as training input that may be provided to the other wireless devices. At 640, the wireless device may receive training input scan data from the other wireless devices. At 650, the wireless device may perform feature extraction (see FIG. 3) on the body of training input scan data (its own, plus the received training input scan data) and may then perform training (see FIG. 4) to generate trained models.

Figure 7:
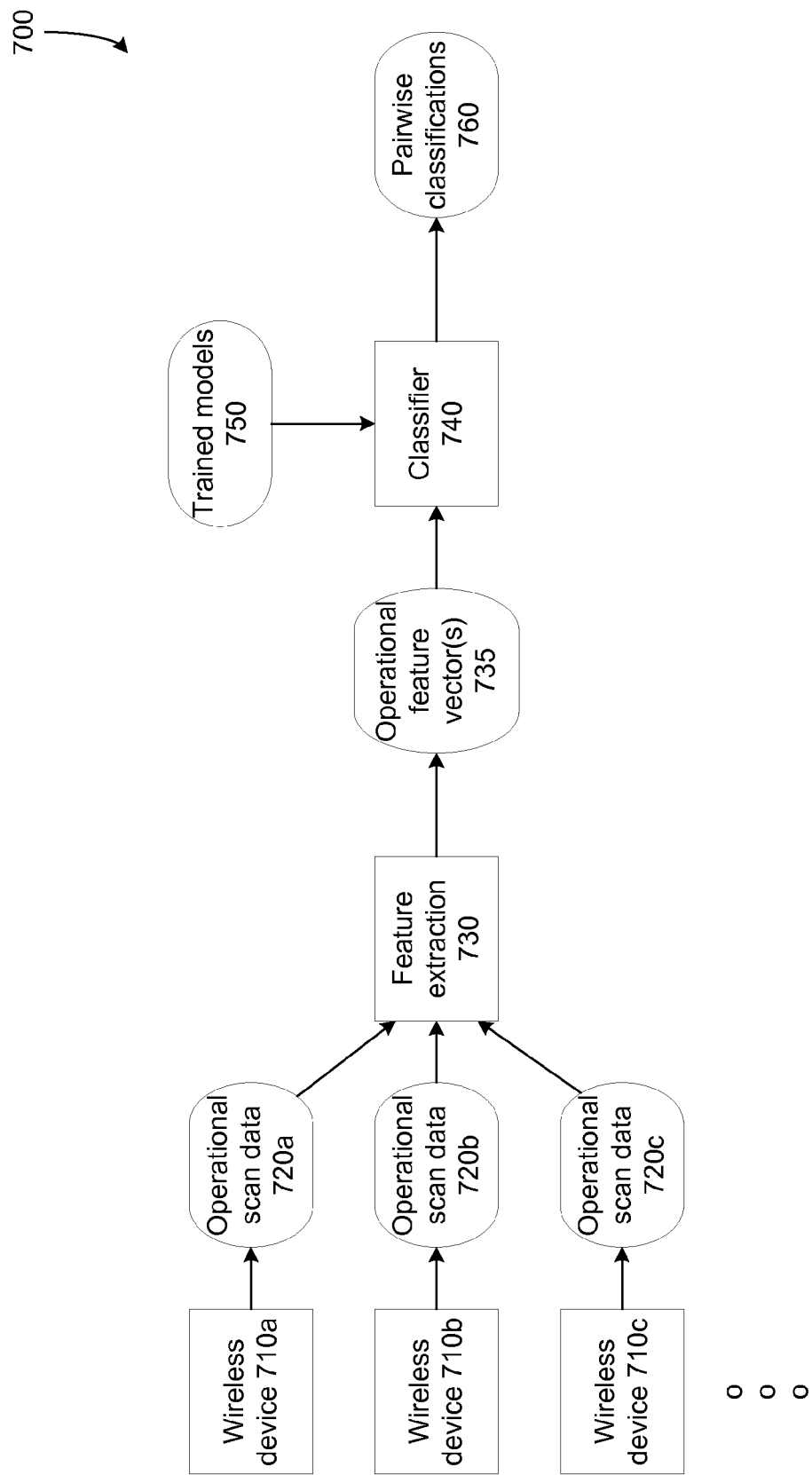
FIG. 7 is a block diagram illustrating a feature extraction and classification process, according to an embodiment.

The operational phase is illustrated in FIG. 7, according to an embodiment. At this point, training models have already been created. The system and method shown in FIG. 7 may then serve to determine a proximity classification for a pair of wireless devices, using these models. Wireless devices 710*a*, 710*b*, 710*c*, . . . each perform a scan of its wi-fi environment to collect information about wireless access points in the environment. As in the training phase, this information may include the identity and number of access points that are accessible by the wireless device. The information may also include the signal strength of such access points. This information may represent operational scan data. Each of the wireless devices may output its operational scan data (720*a*, 720*b*, 720*c*, . . . etc., respectively) to a feature extraction module 730. Feature extraction may be performed as discussed with respect to FIG. 3.

As in the training phase, the output of the feature extraction process may include one or more feature vector(s) 735, this time in an operational context. The operational feature vector(s) may be provided to a classifier module 740. In an embodiment a feature vector is created for a particular pair of wireless devices and provided to the classifier module 740. Here, the feature vector(s) 735 are analyzed with respect to trained models 750, to determine the best fitting model for a pair of wireless devices. Once one of trained models 750 is identified, the corresponding proximity classification for the pair of wireless devices may be determined. The output of the classifier module 740 may include a proximity classification for each pair of wireless devices. These classifications are shown collectively as pairwise classifications 760. As noted above, in an embodiment, there may be three proximity classifications, for example, (1) high, (2) medium, or (3) low proximity. Alternatively, in an embodiment, there may be two classifications, where one wireless device is determined to be (1) inside or (2) outside of a predefined perimeter around a second wireless device.

In an embodiment, the wireless devices may send the operational scan data to an external computing device where feature extraction and classification may take place. In such an embodiment, another computing device, such as a server for example, would incorporate functionality of a feature extraction module and a classifier module. This server would then generate pairwise classifications and provide these classifications to any interested entity.

In an alternative embodiment, the extraction module and classifier module may be incorporated in one or more of the wireless devices themselves. In this case, the wireless devices may exchange their operational scan data among themselves in the manner illustrated in FIG. 5, for example. A device may then input its operational scan data, along with that of other wireless devices as received in the exchange, into its local feature extraction module. The resulting operational feature vector may then be sent to a local classifier for the generation of proximity classifications.

Figure 8:
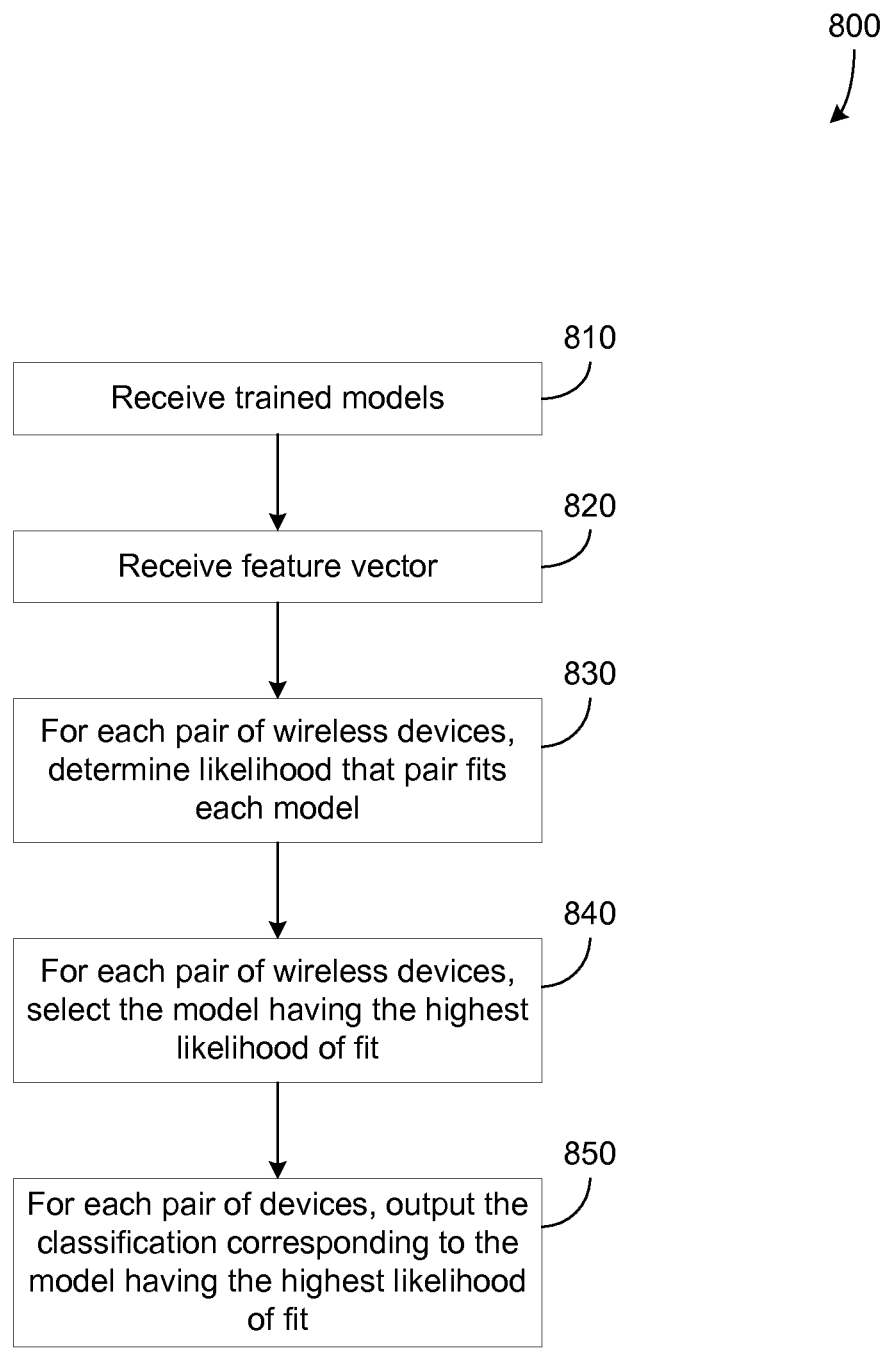
FIG. 8 is a flow chart illustrating a classification process, according to an embodiment.

The processing performed by a classifier module is illustrated in FIG. 8, according to an embodiment. At 810, trained models produced by the trainer module may be received. At 820, a feature vector produced by the feature extraction module may be received. At 830, for each pair of wireless devices, a likelihood is determined with respect to each trained model. This likelihood represents the probability that a pair of wireless devices fits (i.e., is modeled by) a particular trained model. This likelihood may be determined for each pair of wireless devices with respect to each trained model. At 840, the trained model having the greatest likelihood of fit is determined for each pair of wireless devices. This trained model may most closely model the operational feature vector of the pair of wireless devices, relative to the other trained models. At 850, a proximity classification is output for each pair of wireless devices, where the classification corresponds to the trained model that best fits the pair of wireless devices.

While the above description refers to pairs of wireless devices and determining proximity classes for such pairs, the system and processes above may also be adapted for use with respect to larger sets of wireless devices (e.g., three or more) to determine proximity classes among devices in such a set. The concepts described above can be directly extended to allow for the handling of such sets of wireless devices.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, modules composed of such elements, and so forth.

Examples of software may include software components, computer programs, application programs, system programs, machine programs, operating system software, middleware, firmware, software modules, routines, subroutines, functions, methods, procedures, software interfaces, application program interfaces (API), instruction sets, computing code, code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The terms software and firmware, as used herein, may refer to a computer program product including a computer readable medium having computer program logic stored therein to cause a computer system to perform one or more features and/or combinations of features disclosed herein. This computer program logic may represent control logic to direct the processing of the computer. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, random access memory (RAM), read-only memory (ROM), or other data storage device or tangible medium.

Figure 9:
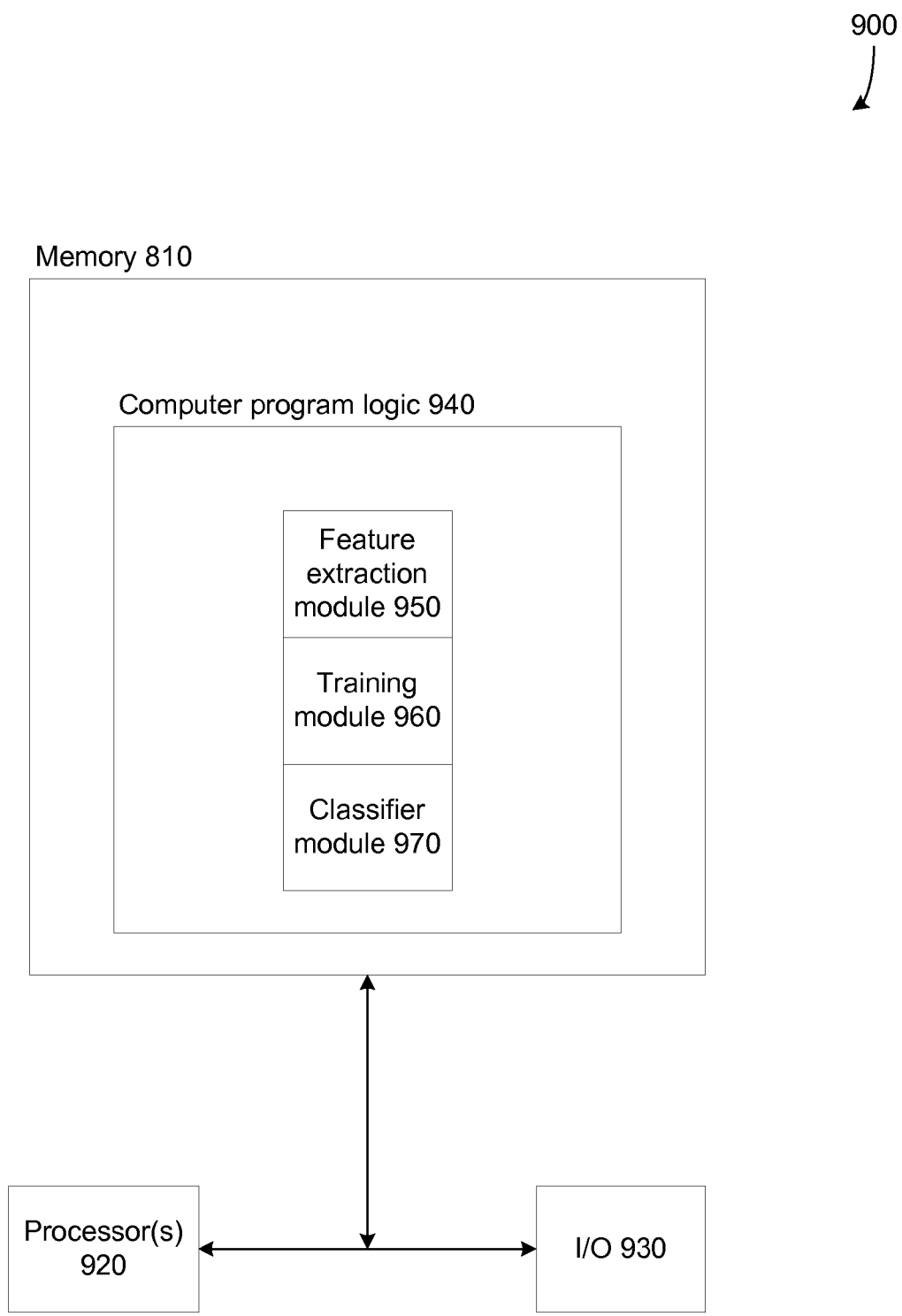
FIG. 9 is a block diagram illustrating a software or firmware embodiment.

A computing system that executes such software/firmware is shown in FIG. 9, according to an embodiment. The illustrated system 900 may include one or more processor(s) 920 and may further include a body of memory 910. Processor(s) 920 may include one or more central processing unit cores and/or a graphics processing unit having one or more GPU cores. Memory 910 may include one or more computer readable media that may store computer program logic 940. Memory 910 may be implemented as a hard disk and drive, a removable media such as a compact disk, a read-only memory (ROM) or random access memory (RAM) device, for example, or some combination thereof. Processor(s) 920 and memory 910 may be in communication using any of several technologies known to one of ordinary skill in the art, such as a bus or point-to-point interconnect. Computer program logic 940 contained in memory 910 may be read and executed by processor(s) 920. One or more I/O ports and/or I/O devices, shown collectively as I/O 930, may also be connected to processor(s) 920 and memory 910.

Computer program logic 940 may include logic that embodies some or all of the processing described above. In the illustrated embodiment, computer program logic 940 may include a feature extraction module 950 that embodies the logic described above with respect to FIG. 3. This module may receive training input scan data and/or operational scan data, and extract features from this data to form feature vectors. Computer program logic 940 may also include a training module 960 that embodies the logic described above with respect to FIG. 4. This module may use one or more training feature vectors received from feature extraction module 950 and create trained models. Computer program logic 940 may also include a classifier module 970 that uses the trained models to identify proximity classifications for pairs of wireless devices, as described above with respect to FIG. 8.

Note that in other embodiments, modules 950, 960 and 970 may be implemented in hardware, or in a combination of hardware, software, and/or firmware.

The embodiments described herein have the advantage of allowing the determination of the proximity of wireless devices to each other, without relying strictly on signal strength indications such as RSSI, or on signal strength indications as provided in current Bluetooth standards.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

The following examples pertain to further embodiments.

Example 1 is a system comprising a feature extraction module, configured to receive training input scan data from a first plurality of wireless devices, wherein the training input scan data comprises information regarding the accessibility of each of the first plurality of wireless devices to one or more wireless access points, to extract features of the training input scan data, to create a plurality of training feature vectors that describe the extracted features of the training input scan data; and a trainer module configured to receive definitions of a plurality of proximity classifications and to produce a plurality of trained models on the basis of the training feature vectors and proximity classifications.

In example 2, the information of example 1 regarding the accessibility of each of the first plurality of wireless devices to one or more wireless access points comprises: for each wireless device of the first plurality of wireless devices, an identity of the wireless access points accessible to the wireless device; for each wireless device of the first plurality of wireless devices, the number of the wireless access points accessible to the wireless device; and for each wireless device of the first plurality of wireless devices, signal strengths of the accessible wireless access points.

In example 3, the extraction of features of example 1 comprises one or more of: determining a number of common access points, wherein the common access points are those access points accessible by two or more of the first plurality of wireless devices; determining a number of access points that are not common to two or more of the first plurality of wireless devices; determining a difference in a signal strength among a pair of wireless devices of the first plurality that detect the access point, the difference determined as a mean squared signal strength deviation for each common access point; determining the percentage of the access point's total signal strength detected by each wireless device of the pair of wireless devices in the first plurality of wireless devices, determined for each access point; determining the percentage of access points that are common access points; and for each pair of wireless devices of the first plurality of wireless devices, determining whether each wireless device in the pair has the same strongest access point as determined by signal strength.

In example 4, the production of trained models by the trainer module of example 1 comprises creation of Gaussian mixture models.

In example 5, the feature extraction module of example 1 is further configured to receive operational scan data from each of one or more of a second plurality of wireless devices, wherein the operational scan data comprises information regarding the accessibility of each of the one or more wireless devices in the second plurality of wireless devices to one or more of the wireless access points, to extract features of the operational scan data, and to create one or more operational feature vectors that describe the extracted features of the operational scan data; and the system of example 1 further comprises a classifier module configured to receive the operational feature vectors and the plurality of trained models; and to produce a proximity classification for each pair of the one or more wireless devices of the second plurality of wireless devices, using the trained models.

In example 6, the information of example 5 regarding the accessibility of each of the one or more wireless devices in the second plurality of wireless devices comprises: for each of the one or more wireless devices of the second plurality of wireless devices, an identity of the wireless access points accessible to the wireless device; for each of the one or more wireless devices of the second plurality of wireless devices, the number of the wireless access points accessible to the wireless device; and for each of the one or more wireless access devices of the second plurality of wireless devices, signal strengths of the accessible wireless access points.

In example 7, the extraction of features of the operational scan data of example 5 comprises one or more of: determining a number of common access points, wherein the common access points are those access points accessible by two or more of the second plurality of wireless devices; determining a number of access points that are not common to two or more of the second plurality of wireless devices; determining a difference in a signal strength among a pair of wireless devices of the second plurality that detect the access point, the difference determined as a mean squared signal strength deviation over the common access points; determining the percentage of the access point's total signal strength detected by each wireless device of the pair of wireless devices in the second plurality of wireless devices, determined for each access point; determining the percentage of access points that are common access points; and for each pair of wireless devices of the second plurality of wireless devices, determining whether each wireless device in the pair has the same strongest access point as determined by signal strength.

In example 8, production of a proximity classification for each pair of the one or more wireless devices of the second plurality of wireless devices of example 5 comprises: for each pair of the one or more wireless devices of the second plurality of wireless devices, determining the trained model that most closely models the operational feature vector; and identifying the proximity classification associated with the determined trained model.

Example 9 is a method, comprising: receiving, at a feature extraction module, training input scan data from a first plurality of wireless devices, wherein the training input scan data comprises information regarding the accessibility of each of the first plurality of wireless devices to one or more wireless access points; extracting features of the training input scan data; creating a plurality of training feature vectors that describe the extracted features of the training input scan data; and at a training module, receiving definitions of a plurality of proximity classifications and producing a plurality of trained models on the basis of the training feature vectors and proximity classifications.

In example 10, the information regarding the accessibility of each of the first plurality of wireless devices to one or more wireless access points of example 9 comprises: for each of the one or more wireless devices of the first plurality of wireless devices, an identity of the wireless access points accessible to the wireless device; for each of the one or more wireless devices of the first plurality of wireless devices, the number of the wireless access points accessible to the wireless device; and for each wireless device of the first plurality of wireless devices, signal strengths of the accessible wireless access points.

In example 11, the extraction of features of example 9 comprises one or more of: determining a number of common access points, wherein the common access points are those access points accessible by two or more of the first plurality of wireless devices; determining a number of access points that are not common to two or more of the first plurality of wireless devices; determining a difference in a signal strength among a pair of wireless devices of the first plurality that detect the access point, the difference determined as a mean squared signal strength deviation over the common access points; determining the percentage of the access point's total signal strength detected by each wireless device of the pair of wireless devices in the first plurality of wireless devices, determined for each access point; determining the percentage of access points that are common access points; and for each pair of wireless devices of the first plurality of wireless devices, determining whether each wireless device in the pair has the same strongest access point as determined by signal strength.

In example 12, the production of trained models by the trainer module of example 9 comprises creation of Gaussian mixture models.

In example 13, the method of example 9 further comprises: receiving, at the feature extraction module, operational scan data from each of one or more of a second plurality of wireless devices, wherein the operational scan data comprises information regarding the accessibility of each of the one or more wireless devices in the second plurality of wireless devices to one or more of the wireless access points; extracting features of the operational scan data; creating one or more operational feature vectors that describe the extracted features of the operational scan data; inputting the operational feature vectors to a classifier module; receiving, at the classification module, the plurality of trained models; and producing, by the classification module, a proximity classification for each pair of the one or more wireless devices of the second plurality of wireless devices using the trained models.

In example 14, the information regarding the accessibility of each of the one or more wireless devices in the second plurality of wireless devices of example 13 comprises: for each of the one or more wireless devices of the second plurality of wireless devices, an identity of the wireless access points accessible to the wireless device; for each of the one or more wireless devices of the second plurality of wireless devices, the number of the wireless access points accessible to the wireless device; and for each of the one or more wireless access devices of the second plurality of wireless devices, signal strengths of the accessible wireless access points.

In example 15, the extraction of features of the operational scan data of example 13 comprises one or more of: determining a number of common access points, wherein the common access points are those access points accessible by two or more of the second plurality of wireless devices; determining a number of access points that are not common to two or more of the second plurality of wireless devices; determining a difference in a signal strength among a pair of wireless devices of the second plurality that detect the access point, the difference determined as a mean squared signal strength deviation over the common access points; determining the percentage of the access point's total signal strength detected by each wireless device of the pair of wireless devices in the second plurality of wireless devices, determined for each access point; determining the percentage of access points that are common access points; and for each pair of wireless devices of the second plurality of wireless devices, determining whether each wireless device in the pair has the same strongest access point as determined by signal strength.

In example 16, the production of a proximity classification for each pair of the one or more wireless devices of the second plurality of wireless devices of example 13 comprises: for each pair of the one or more wireless devices of the second plurality of wireless devices, determining the trained model that most closely models the operational feature vector; and identifying the proximity classification associated with the determined trained model.

In example 17, one or more computer readable media comprising having computer control logic stored thereon, the computer control logic comprising logic configured to cause a processor to: receive training input scan data from a first plurality of wireless devices, wherein the training input scan data comprises information regarding the accessibility of each of the first plurality of wireless devices to one or more wireless access points; extract features of the training input scan data; create a plurality of training feature vectors that describe the extracted features of the training input scan data; receive definitions of a plurality of proximity classifications; and produce a plurality of trained models on the basis of the training feature vectors and proximity classifications.

In example 18, the information regarding the accessibility of each of the first plurality of wireless devices to one or more wireless access points of example 17 comprises: for each of the one or more wireless devices of the first plurality of wireless devices, an identity of the wireless access points accessible to the wireless device; for each of the one or more wireless devices of the first plurality of wireless devices, the number of the wireless access points accessible to the wireless device; and for each wireless device of the first plurality of wireless devices, signal strengths of the accessible wireless access points.

In example 19, the extraction of features of example 17 comprises one or more of: determining a number of common access points, wherein the common access points are those access points accessible by two or more of the first plurality of wireless devices; determining a number of access points that are not common to two or more of the first plurality of wireless devices; determining a difference in a signal strength among a pair of wireless devices of the first plurality that detect the common access point, the difference determined as a mean squared signal strength deviation over the common access points; determining the percentage of the access point's total signal strength detected by each wireless device of the pair of wireless devices in the first plurality of wireless devices, determined for each access point; determining the percentage of access points that are common access points; and for each pair of wireless devices of the first plurality of wireless devices, determining whether each wireless device in the pair has the same strongest access point as determined by signal strength.

In example 20, the production of trained models at the trainer module of example 17 comprises creation of Gaussian mixture models.

In example 21, the control logic of example 17 further comprises logic configured to cause the processor to receive operational scan data from each of one or more of a second plurality of wireless devices, wherein the operational scan data comprises information regarding the accessibility of each of the one or more wireless devices in the second plurality of wireless devices to one or more of the wireless access points; extract features of the operational scan data; create one or more operational feature vectors that describe the extracted features of the operational scan data; and receive the plurality of trained models and producing, on the basis of the operational feature vectors and trained models, a proximity classification for each pair of the one or more wireless devices of the second plurality of wireless devices.

In example 22, the information regarding the accessibility of each of the one or more wireless devices in the second plurality of wireless devices of example 21 comprises: for each of the one or more wireless devices of the second plurality of wireless devices, an identity of the wireless access points accessible to the wireless device; for each of the one or more wireless devices of the second plurality of wireless devices, the number of the wireless access points accessible to the wireless device; and for each of the one or more wireless access devices of the second plurality of wireless devices, signal strengths of the accessible wireless access points.

In example 23, the extraction of features of the operational scan data of example 21 comprises one or more of: determining a number of common access points, wherein the common access points are those access points accessible by two or more of the second plurality of wireless devices; determining a number of access points that are not common to two or more of the second plurality of wireless devices; determining a difference in a signal strength among a pair of wireless devices of the second plurality that detect the access point, the difference determined as a mean squared signal strength deviation over the common access points; determining the percentage of the access point's total signal strength detected by each wireless device of the pair of wireless devices in the second plurality of wireless devices, determined for each access point; determining the percentage of access points that are common access points; and for each pair of wireless devices of the second plurality of wireless devices, determining whether each wireless device in the pair has the same strongest access point as determined by signal strength.

In example 24, the production of a proximity classification for each pair of the one or more wireless devices of the second plurality of wireless devices of example 21 comprises: for each pair of the one or more wireless devices of the second plurality of wireless devices, determining the trained model that most closely models the operational feature vector; and identifying the proximity classification associated with the determined trained model.

Example 25 is system for determining the proximity of wireless devices to each other, comprising: a feature extraction module, configured to receive training input scan data from a first plurality of wireless devices, wherein the training input scan data comprises information regarding the accessibility of each of the first plurality of wireless devices to one or more wireless access points, to extract features of the training input scan data, to create a plurality of training feature vectors that describe the extracted features of the training input scan data; and a trainer module configured to receive definitions of a plurality of proximity classifications and to produce a plurality of trained models on the basis of the training feature vectors and proximity classifications.

In example 26, the information regarding the accessibility of each of the first plurality of wireless devices to one or more wireless access points of example 25 comprises: for each of the one or more wireless devices of the first plurality of wireless devices, an identity of the wireless access points accessible to the wireless device; for each of the one or more wireless devices of the first plurality of wireless devices, the number of the wireless access points accessible to the wireless device; and for each wireless device of the first plurality of wireless devices, signal strengths of the accessible wireless access points.

In example 27, the extraction of features of example 25 comprises one or more of: determining a number of common access points, wherein the common access points are those access points accessible by two or more of the first plurality of wireless devices; determining a number of access points that are not common to two or more of the first plurality of wireless devices; determining a difference in a signal strength among a pair of wireless devices of the first plurality that detect the access point, the difference determined as a mean squared signal strength deviation for each common access point; determining the percentage of the access point's total signal strength detected by each wireless device of the pair of wireless devices in the first plurality of wireless devices, determined for each access point; determining the percentage of access points that are common access points; and for each pair of wireless devices of the first plurality of wireless devices, determining whether each wireless device in the pair has the same strongest access point as determined by signal strength.

In example 28, the production of trained models by the trainer module of example 25 comprises creation of Gaussian mixture models.

In example 29, the feature extraction module of example 25 is further configured to receive operational scan data from each of one or more of a second plurality of wireless devices, wherein the operational scan data comprises information regarding the accessibility of each of the one or more wireless devices in the second plurality of wireless devices to one or more of the wireless access points, to extract features of the operational scan data, and to create one or more operational feature vectors that describe the extracted features of the operational scan data; and the system further comprises a classifier module configured to receive the operational feature vectors and the plurality of trained models; and to produce a proximity classification for each pair of the one or more wireless devices of the second plurality of wireless devices, using the trained models.

In example 30, the information regarding the accessibility of each of the one or more wireless devices in the second plurality of wireless devices of example 29 comprises: for each of the one or more wireless devices of the second plurality of wireless devices, an identity of the wireless access points accessible to the device; for each of the one or more wireless devices of the first plurality of wireless devices, the number of the wireless access points accessible to the wireless device; and for each of the one or more wireless devices of the second plurality of wireless devices, signal strengths of the accessible wireless access points.

In example 31, the extraction of features of the operational scan data of example 29 comprises one or more of: determining a number of common access points, wherein the common access points are those access points accessible by two or more of the second plurality of wireless devices; determining a number of access points that are not common to two or more of the second plurality of wireless devices; determining a difference in a signal strength among a pair of wireless devices of the second plurality that detect the access point, the difference determined as a mean squared signal strength deviation over the common access points; determining the percentage of the access point's total signal strength detected by each wireless device of the pair of wireless devices in the second plurality of wireless devices, determined for each access point; determining the percentage of access points that are common access points; and for each pair of wireless devices of the second plurality of wireless devices, determining whether each wireless device in the pair has the same strongest access point as determined by signal strength.

In example 32, the production of a proximity classification for each pair of the one or more wireless devices of the second plurality of wireless devices of example 29 comprises: for each pair of the one or more wireless devices of the second plurality of wireless devices, determining the trained model that most closely models the operational feature vector; and identifying the proximity classification associated with the determined trained model.

Example 33 is a method of determining the proximity of wireless devices to each other, comprising: receiving, at a feature extraction module, training input scan data from a first plurality of wireless devices, wherein the training input scan data comprises information regarding the accessibility of each of the first plurality of wireless devices to one or more wireless access points; extracting features of the training input scan data; creating a plurality of training feature vectors that describe the extracted features of the training input scan data; and at a training module, receiving definitions of a plurality of proximity classifications and producing a plurality of trained models on the basis of the training feature vectors and proximity classifications.

In example 34, the information regarding the accessibility of each of the first plurality of wireless devices to one or more wireless access points of example 33 comprises: for each of the one or more wireless devices of the first plurality of wireless devices, an identity of the wireless access points accessible to the wireless device; for each of the one or more wireless devices of the first plurality of wireless devices, the number of the wireless access points accessible to the wireless device; and for each wireless device of the first plurality of wireless devices, signal strengths of the accessible wireless access points.

In example 35, the extraction of features of example 33 comprises one or more of: determining a number of common access points, wherein the common access points are those access points accessible by two or more of the first plurality of wireless devices; determining a number of access points that are not common to two or more of the first plurality of wireless devices; determining a difference in a signal strength among a pair of wireless devices of the first plurality that detect the access point, the difference determined as a mean squared signal strength deviation over the common access points; determining the percentage of the access point's total signal strength detected by each wireless device of the pair of wireless devices in the first plurality of wireless devices, determined for each access point; determining the percentage of access points that are common access points; and for each pair of wireless devices of the first plurality of wireless devices, determining whether each wireless device in the pair has the same strongest access point as determined by signal strength.

In example 36, the production of trained models by the trainer module of example 33 comprises creation of Gaussian mixture models.

In example 37, the method of example 33, further comprises: receiving, at the feature extraction module, operational scan data from each of one or more of a second plurality of wireless devices, wherein the operational scan data comprises information regarding the accessibility of each of the one or more wireless devices in the second plurality of wireless devices to one or more of the wireless access points; extracting features of the operational scan data; creating one or more operational feature vectors that describe the extracted features of the operational scan data; inputting the operational feature vectors to a classifier module; receiving, at the classification module, the plurality of trained models; and producing, by the classification module, a proximity classification for each pair of the one or more wireless devices of the second plurality of wireless devices using the trained models.

In example 38, the information regarding the accessibility of each of the one or more wireless devices in the second plurality of wireless devices of example 37 comprises: for each of the one or more wireless devices of the second plurality of wireless devices, an identity of the wireless access points accessible to the wireless device; for each of the one or more wireless devices of the second plurality of wireless devices, the number of the wireless access points accessible to the wireless device; and for each of the one or more wireless access devices of the second plurality of wireless devices, signal strengths of the accessible wireless access points.

In example 39, the extraction of features of the operational scan data of example 37 comprises one or more of: determining a number of common access points, wherein the common access points are those access points accessible by two or more of the second plurality of wireless devices; determining a number of access points that are not common to two or more of the second plurality of wireless devices; determining a difference in a signal strength among a pair of wireless devices of the second plurality that detect the access point, the difference determined as a mean squared signal strength deviation over the common access points; determining the percentage of the access point's total signal strength detected by each wireless device of the pair of wireless devices in the second plurality of wireless devices, determined for each access point; determining the percentage of access points that are common access points; and for each pair of wireless devices of the second plurality of wireless devices, determining whether each wireless device in the pair has the same strongest access point as determined by signal strength.

In example 40, the production of a proximity classification for each pair of the one or more wireless devices of the second plurality of wireless devices of example 37 comprises: for each pair of the one or more wireless devices of the second plurality of wireless devices, determining the trained model that most closely models the operational feature vector; and identifying the proximity classification associated with the determined trained model.

Example 41 is a system for determining the proximity of wireless devices to each other, comprising: means for receiving training input scan data from a first plurality of wireless devices, wherein the training input scan data comprises information regarding the accessibility of each of the first plurality of wireless devices to one or more wireless access points; means for extracting features of the training input scan data; means for creating a plurality of training feature vectors that describe the extracted features of the training input scan data; means for receiving definitions of a plurality of proximity classifications; and means for producing a plurality of trained models on the basis of the training feature vectors and proximity classifications.

In example 42, the information regarding the accessibility of each of the first plurality of wireless devices to one or more wireless access points of example 41 comprises: for each of the one or more wireless devices of the first plurality of wireless devices, an identity of the wireless access points accessible to the wireless device; for each of the one or more wireless devices of the first plurality of wireless devices, the number of the wireless access points accessible to the wireless device; and for each wireless device of the first plurality of wireless devices, signal strengths of the accessible wireless access points.

In example 43, the means for extraction of features of example 41 comprises one or more of: means for determining a number of common access points, wherein the common access points are those access points accessible by two or more of the first plurality of wireless devices; means for determining a number of access points that are not common to two or more of the first plurality of wireless devices; means for determining a difference in a signal strength among a pair of wireless devices of the first plurality that detect the common access point, the difference determined as a mean squared signal strength deviation over the common access points; means for determining the percentage of the access point's total signal strength detected by each wireless device of the pair of wireless devices in the first plurality of wireless devices, determined for each access point; means for determining the percentage of access points that are common access points; and means for determining, for each pair of wireless devices of the first plurality of wireless devices, whether each wireless device in the pair has the same strongest access point as determined by signal strength.

In example 44, the means for production of trained models at the trainer module of example 41 comprises means for creation of Gaussian mixture models.

In example 45, the system of example 41 further comprises: means for receiving operational scan data from each of one or more of a second plurality of wireless devices, wherein the operational scan data comprises information regarding the accessibility of each of the one or more wireless devices in the second plurality of wireless devices to one or more of the wireless access points; means for extracting features of the operational scan data; means for creating one or more operational feature vectors that describe the extracted features of the operational scan data; and means for receiving the plurality of trained models and producing, on the basis of the operational feature vectors and trained models, a proximity classification for each pair of the one or more wireless devices of the second plurality of wireless devices.

In example 46, the information regarding the accessibility of each of the one or more wireless devices in the second plurality of wireless devices of example 45 comprises: for each of the one or more wireless devices of the second plurality of wireless devices, an identity of the wireless access points accessible to the wireless device; for each of the one or more wireless devices of the second plurality of wireless devices, the number of the wireless access points accessible to the wireless device; and for each of the one or more wireless access devices of the second plurality of wireless devices, signal strengths of the accessible wireless access points.

In example 47, the means for extraction of features of the operational scan data of example 45 comprises one or more of: means for determining a number of common access points, wherein the common access points are those access points accessible by two or more of the second plurality of wireless devices; means for determining a number of access points that are not common to two or more of the second plurality of wireless devices; means for determining a difference in a signal strength among a pair of wireless devices of the second plurality that detect the access point, the difference determined as a mean squared signal strength deviation over the common access points; means for determining the percentage of the access point's total signal strength detected by each wireless device of the pair of wireless devices in the second plurality of wireless devices, determined for each access point; means for determining the percentage of access points that are common access points; and means for determining, for each pair of wireless devices of the second plurality of wireless devices, whether each wireless device in the pair has the same strongest access point as determined by signal strength.

In example 48, the means for production of a proximity classification for each pair of the one or more wireless devices of the second plurality of wireless devices of example 45 comprises: means for determining, for each pair of the one or more wireless devices of the second plurality of wireless devices, the trained model that most closely models the operational feature vector; and means for identifying the proximity classification associated with the determined trained model.

Example 49 is a system comprising: a feature extraction module, configured to receive training input scan data from a first plurality of wireless devices, wherein the training input scan data comprises information regarding the accessibility of each of the first plurality of wireless devices to one or more wireless access points, to extract features of the training input scan data, to create a plurality of training feature vectors that describe the extracted features of the training input scan data; and a trainer module configured to receive definitions of a plurality of proximity classifications and to produce a plurality of trained models on the basis of the training feature vectors and proximity classifications.

In example 50, the information regarding the accessibility of each of the first plurality of wireless devices to one or more wireless access points of example 49 comprises: for each of the one or more wireless devices of the first plurality of wireless devices, an identity of the wireless access points accessible to the wireless device; for each of the one or more wireless devices of the first plurality of wireless devices, the number of the wireless access points accessible to the wireless device; and for each wireless device of the first plurality of wireless devices, signal strengths of the accessible wireless access points.

In example 51, the extraction of features of example 49 comprises one or more of: determining a number of common access points, wherein the common access points are those access points accessible by two or more of the first plurality of wireless devices; determining a number of access points that are not common to two or more of the first plurality of wireless devices; determining a difference in its signal strength among a pair of wireless devices of the first plurality that detect the access point, the difference determined as a mean squared signal strength deviation for each common access point; determining the percentage of the access point's total signal strength detected by each wireless device of the pair of wireless devices in the first plurality of wireless devices, determined for each access point; determining the percentage of access points that are common access points; and for each pair of wireless devices of the first plurality of wireless devices, determining whether each wireless device in the pair has the same strongest access point as determined by signal strength.

In example 52, the production of trained models by the trainer module of example 49 comprises creation of Gaussian mixture models.

In example 53, the feature extraction module of example 49 is further configured to receive operational scan data from each of one or more of a second plurality of wireless devices, wherein the operational scan data comprises information regarding the accessibility of each of the one or more wireless devices in the second plurality of wireless devices to one or more of the wireless access points, to extract features of the operational scan data, and to create one or more operational feature vectors that describe the extracted features of the operational scan data; and the system further comprises: a classifier module configured to receive the operational feature vectors and the plurality of trained models; for each pair of the one or more wireless devices of the second plurality of wireless devices, determine the trained model that most closely models the operational feature vector; and identify the proximity classification associated with the determined trained model.

In example 54, the information regarding the accessibility of each of the one or more wireless devices in the second plurality of wireless devices of example 53 comprises: for each of the one or more wireless devices of the second plurality of wireless devices, an identity of the wireless access points accessible to the wireless device; for each of the one or more wireless devices of the second plurality of wireless devices, the number of the wireless access points accessible to the wireless device; and for each of the one or more wireless access devices of the second plurality of wireless devices, signal strengths of the accessible wireless access points.

In example 55, the extraction of features of the operational scan data of example 53 comprises one or more of: determining a number of common access points, wherein the common access points are those access points accessible by two or more of the second plurality of wireless devices; determining a number of access points that are not common to two or more of the second plurality of wireless devices; determining a difference in a signal strength among a pair of wireless devices of the second plurality that detect the access point, the difference determined as a mean squared signal strength deviation over the common access points; determining the percentage of the access point's total signal strength detected by each wireless device of the pair of wireless devices in the second plurality of wireless devices, determined for each access point; determining the percentage of access points that are common access points; and for each pair of wireless devices of the second plurality of wireless devices, determining whether each wireless device in the pair has the same strongest access point as determined by signal strength.

Example 56 is a method, comprising: receiving, at a feature extraction module, training input scan data from a first plurality of wireless devices, wherein the training input scan data comprises information regarding the accessibility of each of the first plurality of wireless devices to one or more wireless access points; extracting features of the training input scan data; creating a plurality of training feature vectors that describe the extracted features of the training input scan data; and at a training module, receiving definitions of a plurality of proximity classifications and producing a plurality of trained models on the basis of the training feature vectors and proximity classifications.

In example 57, the information regarding the accessibility of each of the first plurality of wireless devices to one or more wireless access points of example 56 comprises: for each of the one or more wireless devices of the first plurality of wireless devices, an identity of the wireless access points accessible to the wireless device; for each of the one or more wireless devices of the first plurality of wireless devices, the number of the wireless access points accessible to the wireless device; and for each wireless device of the first plurality of wireless devices, signal strengths of the accessible wireless access points.

In example 58, the extraction of features of example 56 comprises one or more of: determining a number of common access points, wherein the common access points are those access points accessible by two or more of the first plurality of wireless devices; determining a number of access points that are not common to two or more of the first plurality of wireless devices; determining a difference in a signal strength among a pair of wireless devices of the first plurality that detect the access point, the difference determined as a mean squared signal strength deviation over the common access points; determining the percentage of the access point's total signal strength detected by each wireless device of the pair of wireless devices in the first plurality of wireless devices, determined for each access point; determining the percentage of access points that are common access points; and for each pair of wireless devices of the first plurality of wireless devices, determining whether each wireless device in the pair has the same strongest access point as determined by signal strength.

In example 59, the production of trained models by the trainer module of example 56 comprises creation of Gaussian mixture models.

In example 60, the method of example 56, further comprises: receiving, at the feature extraction module, operational scan data from each of one or more of a second plurality of wireless devices, wherein the operational scan data comprises information regarding the accessibility of each of the one or more wireless devices in the second plurality of wireless devices to one or more of the wireless access points; extracting features of the operational scan data; creating one or more operational feature vectors that describe the extracted features of the operational scan data; inputting the operational feature vectors to a classifier module; receiving, at the classification module, the plurality of trained models; for each pair of the one or more wireless devices of the second plurality of wireless devices, determining the trained model that most closely models the operational feature vector; and identifying the proximity classification associated with the determined trained model.

In example 61, the information regarding the accessibility of each of the one or more wireless devices in the second plurality of wireless devices of example 60 comprises: for each of the one or more wireless devices of the second plurality of wireless devices, an identity of the wireless access points accessible to the wireless device; for each of the one or more wireless devices of the second plurality of wireless devices, the number of the wireless access points accessible to the wireless device; and for each of the one or more wireless access devices of the second plurality of wireless devices, signal strengths of the accessible wireless access points.

In example 62, the extraction of features of the operational scan data of example 60 comprises one or more of: determining a number of common access points, wherein the common access points are those access points accessible by two or more of the second plurality of wireless devices; determining a number of access points that are not common to two or more of the second plurality of wireless devices; determining a difference in a signal strength among a pair of wireless devices of the second plurality that detect the access point, the difference determined as a mean squared signal strength deviation over the common access points; determining the percentage of the access point's total signal strength detected by each wireless device of the pair of wireless devices in the second plurality of wireless devices, determined for each access point; determining the percentage of access points that are common access points; and for each pair of wireless devices of the second plurality of wireless devices, determining whether each wireless device in the pair has the same strongest access point as determined by signal strength.

Example 63 is one or more computer readable media comprising having control logic stored thereon, the computer control logic comprising logic configured to cause a processor to cause a processor to perform the method of any of claims 56-62.

What is claimed is:

1. An apparatus, comprising, a processor and memory configured to:
   receive a first set of scan data that includes information regarding wireless access points available to each device of the first group;
   compute a set of statistics for each of multiple subsets of devices of the first group based on the first set of scan data;
   classify each of the subsets of devices in one of multiple proximity classes;
   train a model to classify the subsets of devices in the respective proximity classes based on the respective sets of statistics;
   receive a second set of scan data that includes information regarding wireless access points available to each device of a second group;
   compute the set of statistics for the second group of devices based on the second set of scan data; and
   classify the second group devices in one of the proximity classes based on the set of statistics of the second group and the model.

2. The apparatus of claim 1, wherein the first set of scan data includes indications of signal strengths of the wireless access points accessible to the respective devices of the first group, and wherein the processor and memory are further configured to:
   compute the set of statistics for each subset of devices of the first group based on the wireless access points accessible to the devices of the respective subset and the respective signal strengths.

3. The apparatus of claim 1, wherein the processor and memory are further configured to compute the set of statistics for each subset of devices of the first group to include one or more of:
   a number of wireless access points that are accessible to multiple devices of the respective subset,
   a difference in signal strengths of a wireless access point that is accessible to multiple devices of the respective subset,
   a number of wireless access points that are not accessible to multiple devices of the respective subset,
   a percentage of a total signal strength of a wireless access point detected by each of multiple devices of the respective subset,
   a percentage of wireless access points accessible to multiple devices of the respective subset, relative to wireless access points accessible to at least one device of the respective subset, and
   an indication if a wireless access point provides a highest signal strength to all devices of the respective subset of devices.

4. The apparatus of claim 1, wherein the processor and memory are further configured to compute the set of statistics for pairs of devices of the first group.

5. The apparatus of claim 1, wherein a device of a third group of devices is configured to exchange scan data with another device of the third group, compute the set of statistics for the third group of devices based on the exchanged scan data, and classify the third group of devices in one of the proximity classes based on the set of statistics of the third group and the model.

6. The apparatus of claim 1, wherein the proximity classes correspond to proximities of the respective devices relative to one another.

7. A non-transitory computer readable medium encoded with a computer program that includes instructions to cause a processor to:
   receive a first set of scan data that includes information regarding wireless access points available to each device of the first group;
   compute a set of statistics for each of multiple subsets of devices of the first group based on the first set of scan data;
   classify each of the subsets of devices in one of multiple proximity classes;
   train a model to classify the subsets of devices in the respective proximity classes based on the respective sets of statistics;
   receive a second set of scan data that includes information regarding wireless access points available to each device of a second group;
   compute the set of statistics for the second group of devices based on the second set of scan data; and
   classify the second group of devices in one of the proximity classes based on the set of statistics of the second group and the model.

8. The non-transitory computer readable medium of claim 7, wherein the first set of scan data includes indications of signal strengths of the wireless access points accessible to the respective devices of the first group, and wherein the instructions include instructions to cause the processor to:
   compute the set of statistics for each subset of devices of the first group based on the wireless access points accessible to the devices of the respective subset and the respective signal strengths.

9. The non-transitory computer readable medium of claim 7, further including instructions to cause the processor to compute the set of statistics for each subset of devices of the first group to include one or more of:
   a number of wireless access points that are accessible to multiple devices of the respective subset, a difference in signal strengths of a wireless access point that is accessible to multiple devices of the respective subset, a number of wireless access points that are not accessible to multiple devices of the respective subset, a percentage of a total signal strength of a wireless access point detected by each of multiple devices of the respective subset, a percentage of wireless access points accessible to multiple devices of the respective subset, relative to wireless access points accessible to at least one device of the respective subset, and an indication if a wireless access point provides a highest signal strength to all devices of the respective subset of devices.

10. The non-transitory computer readable medium of claim 7, further including instructions to cause the processor to:

compute the set of statistics for pairs of devices of the first group.

11. The non-transitory computer readable medium of claim 7, further including instructions to cause a processor of a device of a third group of devices to exchange scan data with another device of the third group, compute the set of statistics for the third group of devices based on the exchanged scan data, and classify the third group of devices in one of the proximity classes based on the set of statistics of the third group and the model.

12. The non-transitory computer readable medium of claim 7, wherein the proximity classes correspond to proximities of the respective devices relative to one another.

13. A machine-implemented method, comprising:

receiving a first set of scan data that includes information regarding wireless access points available to each device of the first group;

computing a set of statistics for each of multiple subsets of devices of the first group based on the first set of scan data;

classifying each of the subsets of devices in one of multiple proximity classes;

training a model to classify the subsets of devices in the respective proximity classes based on the respective sets of statistics;

receiving a second set of scan data that includes information regarding wireless access points available to each device of a second group;

computing the set of statistics for the second group of devices based on the second set of scan data; and classifying the second group of devices in one of the proximity classes based on the set of statistics of the second group and the model.

14. The machine-implemented method of claim 13, wherein the first set of scan data includes indications of signal strengths of the wireless access points accessible to the respective devices of the first group, and wherein the computing a set of statistics includes:

computing the set of statistics for each subset of devices of the first group based on the wireless access points accessible to the devices of the respective subset and the respective signal strengths.

15. The machine-implemented method of claim 13, wherein the computing a set of statistics includes compute the set of statistics for each subset of devices of the first group to include one or more of:

a number of wireless access points that are accessible to multiple devices of the respective subset, a difference in signal strengths of a wireless access point that is accessible to multiple devices of the respective subset, a number of wireless access points that are not accessible to multiple devices of the respective subset, a percentage of a total signal strength of a wireless access point detected by each of multiple devices of the respective subset, a percentage of wireless access points accessible to multiple devices of the respective subset, relative to wireless access points accessible to at least one device of the respective subset, and an indication if a wireless access point provides a highest signal strength to all devices of the respective subset of devices.

16. The machine-implemented method of claim 13, wherein the computing a set of statistics includes computing the set of statistics for pairs of devices of the first group.

17. The machine-implemented method of claim 13, further including:

performing the receiving a first set of scan data, the computing a set of statistics, the classifying each of the subsets, the training, and the outputting on a server system; and performing the receiving a second set of scan data, the computing the set of statistics for the second group of devices, and the classifying the second group of devices on a device of the second group;

wherein the receiving a second set of scan data further includes exchanging scan data with the second device.

18. The machine-implemented method of claim 13, wherein the proximity classes correspond to proximities of the respective devices relative to one another.

* * * * *